(Model.)

B. F. LAMB.
HAND COTTON GATHERER.

No. 258,657. Patented May 30, 1882.

Witnesses:
F. L. Ouraud
L. L. Miller

Inventor:
Benjamin F. Lamb.
per Chas. H. Fowler.
Attorney

United States Patent Office.

BENJAMIN F. LAMB, OF BELVIDERE, NORTH CAROLINA.

HAND COTTON-GATHERER.

SPECIFICATION forming part of Letters Patent No. 258,657, dated May 30, 1882.

Application filed November 21, 1881. (Model.)

*To all whom it may concern:*

Be it known that I, BENJ. F. LAMB, a citizen of the United States, residing at Belvidere, in the county of Perquimons and State of North Carolina, have invented certain new and useful Improvements in Hand Cotton-Gatherers; and I do hereby declare that the following is a full, clear, and exact description of the same, reference being had to the annexed drawings, making a part of this specification, and to the letters and figures of reference marked thereon.

Figure 1:
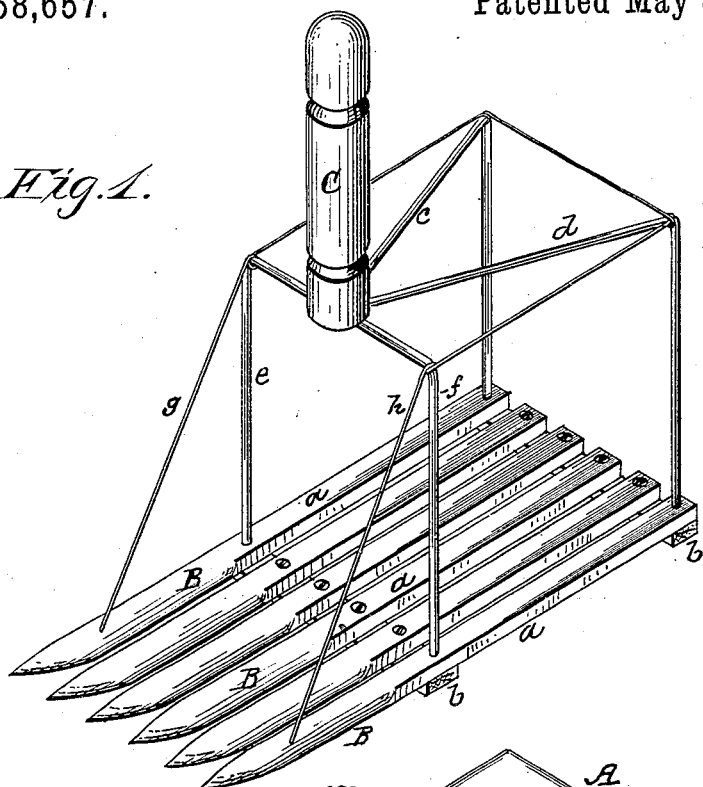
Figure 2:
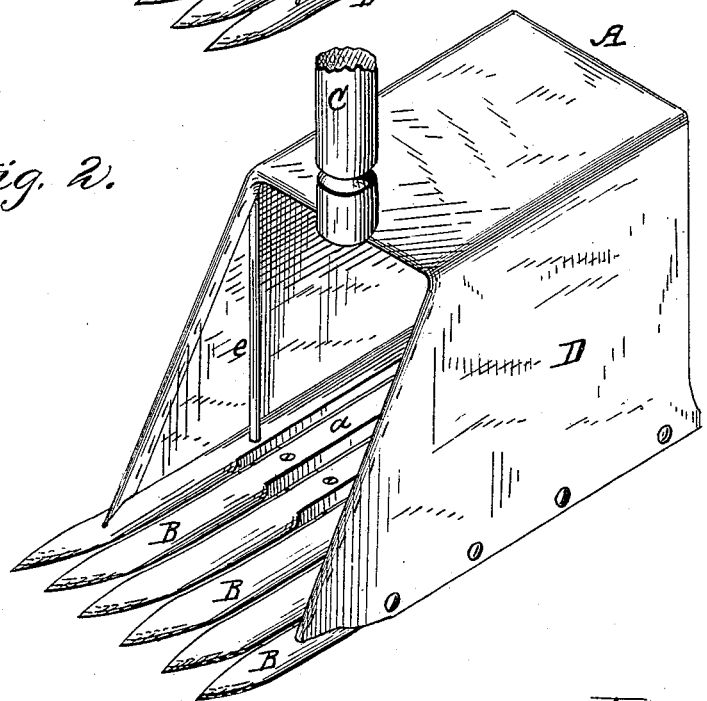

Figure 1 of the drawings is a perspective view of my invention with the covering of the receptacle removed to show the wire frame, and Fig. 2 is a similar view with the covering in place.

The present invention has relation to certain new and useful improvements in hand cotton-gatherers; and the object thereof is to provide a light, simple, and effective device whereby the cotton in the boll may be gathered from the stalk with great ease and rapidity, and afterward picked by hand or by machinery in the usual manner. These objects I attain by the construction substantially as shown in the drawings and hereinafter described.

In the accompanying drawings, A represents the receptacle of the device for containing and holding the cotton after being gathered in the boll from the stalk; and B represents the gathering-fingers, of wood or other suitable material. These fingers are arranged a short distance apart and parallel with each other, and are each formed with a shank, $a$, which are connected by screws or other well-known means to cross-stays $b$, thus holding and retaining them in position. The series of shanks $a$, when connected to the cross-stays $b$, form one of the sides of the receptacle A, the remaining sides thereof being formed by a suitable wire frame and covering, hereinafter described.

The wire frame consists of the wires $c\ d$, inserted in the handle C, and are bent horizontally at an acute angle with each other and vertically in a downward direction, the ends thereof being firmly connected to the rear ends of the shanks $a$ of the two outer fingers, and also the cross-stay through which they pass. The wires $e\ f$ are also connected or inserted in the handle C, and extend out from each side thereof in a horizontal direction and vertically or at right angles in a downward direction, its end being connected in a similar manner to the shanks and cross-stay. Wires $g\ h$, of somewhat lighter construction, are connected to the wires $c\ d\ e\ f$ to form a hollow square or frame-work at the side of the receptacle A, to which the handle C projects, and at the front of said receptacle the wires $g\ h$ extend down at an acute angle with the vertical portions of the wires $e\ f$, and are suitably connected or fastened to the two outer ones of the fingers B, thereby forming braces for said fingers and admitting the covering D upon either side of the receptacle. This covering D may be of cloth, canvas, wire-gauze, or any suitable material found best adapted to the purpose and that will retain the cotton until it is filled, the receptacle, when filled, being emptied, and the process of gathering again proceeded with, said receptacle being of any required size and capacity.

The method of using the device is as follows: It is held by the short handle C, which will act as a lever under the arm, the fingers B being carried underneath the stalk, and with the other hand the operator gathers the scattered limbs into place, and, lifting the machine or device, thus strips the stalks and limbs of cotton.

Having now fully described my invention, what I claim as new, and desire to secure by Letters Patent, is—

1. In a hand cotton-gatherer, the combination, with a suitable receptacle, A, provided with handle C, of the fingers B, having shanks $a$, which, when together, form one of the sides of the receptacle, substantially as and for the purpose set forth.

2. In a hand cotton-gatherer, the fingers B, having shanks $a$, in combination with the frame composed of the wires $c\ d\ e\ f\ g\ h$, bent as shown, and having the handle C, said frame being covered with a suitable material, substantially as and for the purpose specified.

In testimony that I claim the above I have hereunto subscribed my name in the presence of two witnesses.

B. F. LAMB.

Witnesses:
J. ROBT. PARKER,
JOHN A. VANN.